US006755454B1

(12) United States Patent  
Cary

(10) Patent No.: US 6,755,454 B1  
(45) Date of Patent: Jun. 29, 2004

(54) SLAIN ANIMAL TRANSPORTING DEVICE AND METHOD OF USE

(76) Inventor: Robert Cary, 40 Converse, Lapeer, MI (US) 48446

( * ) Notice: Subject to any disclaimer, the term of this patent is extended or adjusted under 35 U.S.C. 154(b) by 0 days.

(21) Appl. No.: 10/235,211

(22) Filed: Sep. 5, 2002

(51) Int. Cl.$^7$ ............................ A01M 31/00; B65G 7/12
(52) U.S. Cl. ........................................ 294/150; 294/165
(58) Field of Search .................... 294/15, 74, 82.14, 294/137, 149, 150, 165, 25; 119/793, 802, 805, 864; 224/103, 921

(56) References Cited

U.S. PATENT DOCUMENTS

| | | | |
|---|---|---|---|
| 2,669,221 A | * | 2/1954 | Major ........................ 119/805 |
| 2,931,629 A | | 4/1960 | Keller |
| 3,547,456 A | | 12/1970 | Sapp |
| 3,592,502 A | * | 7/1971 | Bolliger ........................ 294/74 |
| 3,625,559 A | * | 12/1971 | Lawrence ..................... 294/74 |
| 4,019,463 A | * | 4/1977 | Kitchen ....................... 119/793 |
| 4,025,100 A | * | 5/1977 | Bridgehouse ................. 294/74 |
| 4,132,427 A | | 1/1979 | McGee |
| 4,243,164 A | | 1/1981 | Burlison et al. |
| 4,317,257 A | * | 3/1982 | Engel ......................... 452/128 |
| 4,327,850 A | * | 5/1982 | Robinson, Jr. ............... 224/103 |
| 4,425,000 A | * | 1/1984 | Keck, Jr. .................... 294/165 |
| 4,529,240 A | | 7/1985 | Engel |
| 4,887,823 A | | 12/1989 | Hallett et al. |
| 5,005,527 A | * | 4/1991 | Hatfield ....................... 119/793 |
| 5,456,213 A | * | 10/1995 | Beauchamp ................. 119/793 |
| 5,901,999 A | | 5/1999 | Brock |
| 6,089,636 A | * | 7/2000 | Harris ......................... 294/150 |
| 6,129,399 A | * | 10/2000 | Burch, Sr. ................... 294/153 |
| 6,142,547 A | * | 11/2000 | Bowerman .................. 294/150 |

* cited by examiner

*Primary Examiner*—Dean J. Kramer
(74) *Attorney, Agent, or Firm*—Reising, Ethington, Barnes, Kisselle, P.C.

(57) ABSTRACT

A slain animal transporting device has a series of elongated flexible members each having a slip knot at one end to snugly secure about any variety of body parts of a slain animal, and a user loop at an opposite end which, depending upon the terrain and thus most efficient angle of pull, directly attaches to a wrist, torso or shoulder of at least one user/sportsman. When the user loop is strapped about the wrist, the angle of pull is relatively low which is ideal for smooth terrain. When the user loop is strapped about the torso or shoulder of the sportsman, the angle of pull is greater and thus more ideal for rough terrain such as dense wooded areas. The elongated flexible members are easily coiled for compact storage thus providing easy transportation amongst the portable gear of the mobile sportsman. The straps can be arranged in parallel, enabling multiple sportsmen to drag a single slain animal, or, any number of straps can be slip knotted end-to-end to create a single and extra long transporting device. Moreover, multiple straps can be provided as a set having varying lengths and sizes to meet the demands of different wilderness terrains, and game sizes and types.

9 Claims, 2 Drawing Sheets

SLAIN ANIMAL TRANSPORTING DEVICE AND METHOD OF USE

TECHNICAL FIELD

This invention relates to a slain animal transporting device and more particularly to a slain animal transporting device which is coiled when stored.

BACKGROUND OF THE INVENTION

Hunters and particularly sportsmen typically hunt their game within a wilderness environment often in remote locations far from traveled roads and automotive transporting. Once the game is slain, the animal must be transported to a civilized establishment for gutting, skinning, meat processing, and/or trophy mounting. Particularly when the slain animal or dead game is heavy, such as elk or deer often exceeding one hundred pounds, dragging of the carcass over rough wilderness terrain is difficult and sometimes impossible for one person to handle. This is particularly true when the terrain comprises exposed roots, twigs, rocks, and other projections which can snag the carcass and prevent forward movement. The dragging of heavy carcasses such as deer is further aggravated by the inability of one sportsman to assist another in the dragging of a single carcass because of a lack of space near the grab locations of the slain animal. Moreover, known devices for transporting of game are often bulky and not easily stored within the backpack or carrying cases of the hiking sportsmen.

SUMMARY OF THE INVENTION

A slain animal transporting device has a series of elongated flexible members each having a slip knot at one end to snugly secure about any variety of body parts of a slain animal, and a user loop at an opposite end to engage to or provide a gripping means for the user/sportsman. The elongated flexible members are easily coiled for compact storage and easy transportation amongst the portable gear of the mobile sportsman. The straps can be arranged in parallel, enabling multiple sportsmen to drag a single slain animal, or, any number of straps can be slip knotted end-to-end to create a single and extra long transporting device. Moreover, multiple straps can be provided as a set having varying lengths and sizes to meet the demands of different wilderness terrains, and game sizes and types.

Advantages of the present invention include a durable, rugged and inexpensive means to transport a wide variety of slain animals from a wide variety of wilderness terrains. Moreover, the transporting device of the present invention enables teamwork from multiple sportsmen to drag a single carcass. Yet still, the transporting device is compact when stored and light for easy storage and transporting by the mobile sportsman.

BRIEF DESCRIPTION OF THE DRAWINGS

The present preferred embodiments of the invention are disclosed in the following description and accompanying drawings wherein.

DETAILED DESCRIPTION OF THE PREFERRED EMBODIMENTS

Figure 1:
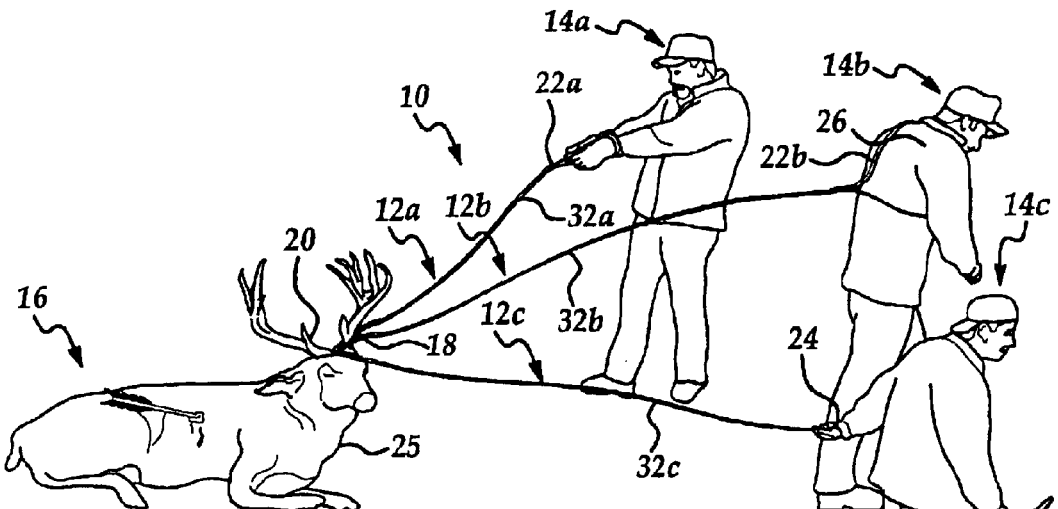
FIG. 1 is a perspective view a slain animal transporting device of the present invention used by three respective sportsmen upon one slain animal.

Referring to FIG. 1, a slain animal transporting device 10 has three flexible elongated members or straps 12a, 12b, and 12c used as a set and distributed amongst three respective sportsmen 14a, 14b, and 14c in various orientations to drag the carcass of a slain animal 16. All three members 12a–c have a slip knot 18 at one end which secures to an antler base 20 of the carcass 16 which may be any variety of species including that of buck deer, elk and moose. The other end of each member 12a–c has respective user loops 22a–c which secure to or are held by the respective users or sportsmen 14a–c. The elongated members 12a–c of the transporting device 10 have varying lengths which enable the sportsmen 14a–c to align themselves in a near single file line (not shown) thus concentrating their pulling efforts in a near forward direction only, as oppose to wasting effort in opposing lateral directions.

The elongated members 12a–c are illustrated as flexible straps which are easily coiled and stored as a compact unit within the confines of a sportsman's back-pack. The elongated members 12a–c may also be made of a rope, cable or other flexible member, however, storage of such items may require additional space. Each strap 12a–c have respective tensile lengths 32a–c extending between the slip knot or choke loop 18, which wraps about the antlers 20 of the slain animal 16, and the respective user loops 22a–c, which secure comfortably about a variety of body portions of the sportsmen, such as the wrist 24 for flexible member 12a and/or 12c, or the torso section 26 for flexible member 12b. The tensile lengths 32a–c of the straps 12a–c can be of varying lengths and positioned substantially in parallel to one another, so that a series of sportsmen 14a–c, as best illustrated in FIG. 1 can all contribute toward the pulling of the slain animal without crossing each other's paths. Moreover, the straps 12a, 12c having the respective user loops 22a, 22c which engage the wrists 24 preferably have shorter tensile lengths 32a, 32c than the strap having the torso user loop 22b. This is because, the wrist user loops 22a, 22c combined with the shorter tensile lengths 32a, 32c are better suited for orientating or steering a carcass 16 as it is dragged through dense brush. In wilderness areas of lower brush density, the straps 12a–c may be slip knotted to one another in series producing a much longer transporting device 10.

When the straps 12a–c are pulled taught, the tensile lengths 32a–c are at a slight angle since the user loops 22a–c typically engage a portion of the sportsman's body which is higher than the elevation of the slain animal 16. This tends to slightly lift the head section of the animal upward thereby providing a ramp surface 25 of the carcass typically or generally at the neck section which can elevate the carcass over protruding obstructions on the wilderness floor thereby producing a type of sledding effect, as best shown in FIG. 1.

Figure 2:
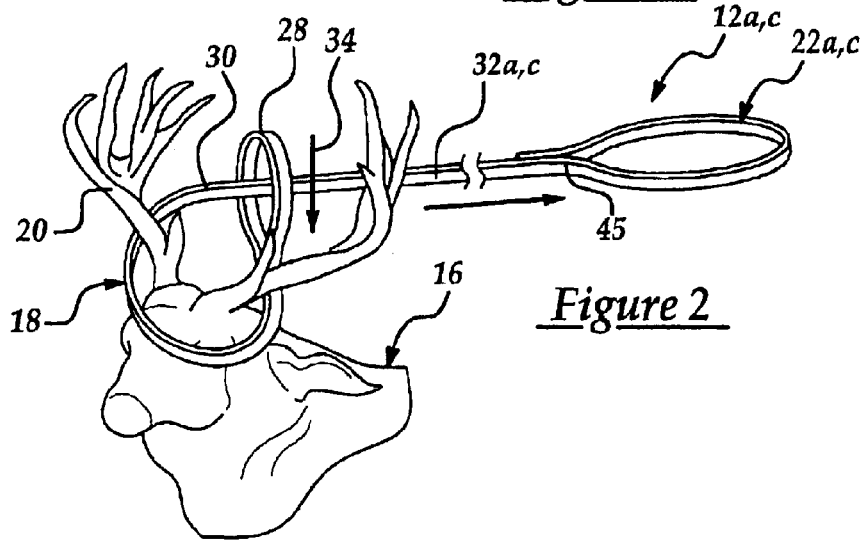
FIG. 2 is a perspective view of an elongated flexible member of the slain animal transporting device being slip knotted about antlers of a slain buck.
Figure 3:
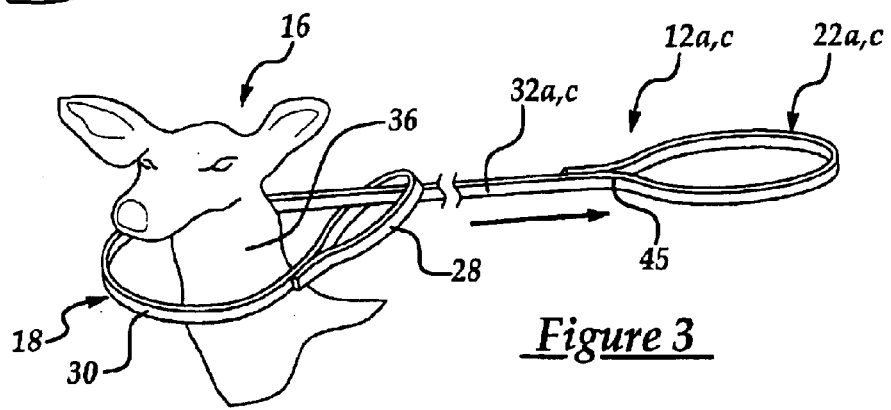
FIG. 3 is a perspective view of the elongated member being slip knotted about a neck of a slain doe.

Referring to FIGS. 2–6, each slip knot 18 comprises a small sub-loop 28 at a distal end of each strap 12a–c and a slip section 30 of each strap 12a–c. The slip knot 18 is formed by feeding the respective user loop 22a–c and a majority portion of the respective tensile length 32a–c of the particular strap 12a–c through the sub loop. As best shown in FIG. 2, the slip knot 18 is initially formed and performs preferably about the base 20 of the antlers which typically spread out in a wide array. As the sportsmen 14a–c pull upon the respective user loop 22a–c, creating a tension through the tensile length 32a–c of the strap 12a–c the diameter of the slip knot 18 becomes ever smaller until the knot 18 tightens about the base 20 of the antlers and the sub loop 28 engages and pulls laterally tightly against the slip section 30 of the tensile length 32a–c, as best shown via arrow 34 of FIG. 2. Referring to FIG. 3, the slip knot 18 is inherently adjustable depending upon the slain animal type and size and thus uses varying lengths of the tensile length 32a–c as the slip section 30. For instance, if the slain animal 16 is a doe, as opposed to an antlered buck, the slip section 30 should typically loop about or encircle a neck 36 of the doe thereby requiring a larger loop diameter which would increase the length of the slip section required.

Figure 4:
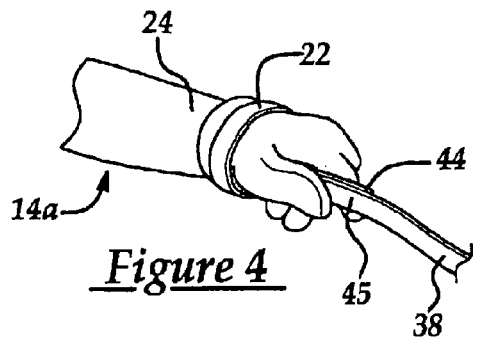
FIG. 4 is a an enlarged partial perspective view of a user loop of the elongated member being looped about a wrist of the sportsman.
Figure 5:
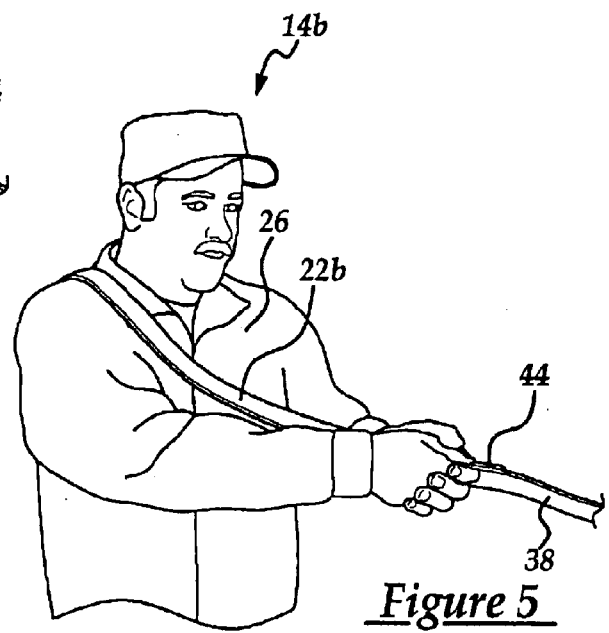
FIG. 5 is a partial perspective view of the user loop of the elongated member looped about a torso section of the sportsman.
Figure 6:
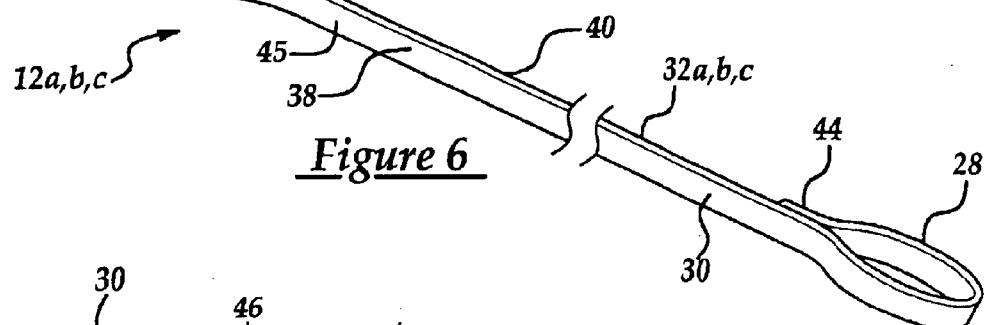
FIG. 6 is a segmented perspective view of the elongated member.

The strap 12a–c as illustrated has a flat first side 38 which forms the outward facing radial surface of the user loop 22a–c and the sub loop 28. An opposite flat second side 40 of the strap 12a–c forms the inward facing radial surface of the user and respective sub loops 22a–c, 28. Of course this order may be reversed for any one or both loops depending upon how the loops are fabricated. When the slip knot 18 is formed, as previously described, the second side 40 or inner surface of the sub loop 28 is generally engaged directly to either the first or second sides 38, 40 along the slip section 30 of the tensile length 32a–c. The second side 40 of the user loop 22a–c or inner surface is engaged directly against a portion of the sportsman's body. For instance, as best shown in FIG. 4, the second side 40 is engaged directly to a back side of the wrist 24 of the user's hand, while the gripping fingers and thumb are generally in direct contact with the first side 38 at a connection joint or grip section 44 of the user loop 22a, 22c. In this orientation, the majority of the pulling force or stress is placed upon the back of the hand or back of the wrist 24, thus easing any stress placed upon the fingers which would otherwise become fatigued over time. Similarly, as best shown in FIG. 5 and with a larger user loop 22b, the second side 40 forming the inner surface of the larger user loop 22b is engaged against the torso section 26 or across the shoulder blades of the user 14b, if the user is walking backwards, or it may be engaged against the chest of the torso section 26 of the user 14b, if the user is walking forward, as best shown in the middle sportsman of FIG. 1. The point being, the transporting device 10 is highly versatile and permits a wide variety of user positions necessary to transport the slain animal 16.

Figure 7:
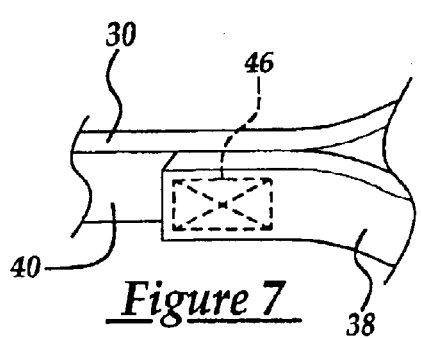
FIG. 7 is an enlarged perspective view of a connection joint of the elongated member.

Both the user loop 22a–c and the respective sub loop 28 are not twisted unto themselves and are thus capable of folding flat. More specifically, the respective connection joints 44 of the loops 22a–c, 28 are formed by direct engagement of the second side 40 at the distal ends of the strap 12a–c being looped and engaged back to the second side carried by respective user and slip sections 45, 30 of the tensile length 32a–c. This engagement is created via a cross-stitching 46 through the strap material as best shown in FIG. 7.

The material of the strap 12a–c is preferably made of nylon or some other material capable of withstanding prolonged moist or humid environments and having a high tensile strength. In addition, nylon is preferable because it can be cut with a hot iron thus melting the cut ends to prevent fraying of the weaved nylon. The width of the sides 38, 40 is approximately within the range of three quarters of an inch to two inches. A one inch width is preferred because a smaller width of a strap would uncomfortably press into the wrist or torso of the user 14a–c when pulling a slain animal weighing substantially over the one hundred pounds, and a wider width would require more space to store, are excessively strong, and more expensive. Moreover, widths created in excess of two inches in hopes to supply comfort for the user are considered unnecessary since gloves, coats, jackets, or the like will provide a cushioning effect beneath the user loop 22a–c of the strap 12a–c. One example of a one inch wide nylon strap having a tensile strength of 3,800 pounds is model number N0019, manufactured by Tapecraft Corporation of Anniston, Ala. This particular strap is made of a tubular weave. The weave of the strap bit can also be supplied in a more expensive herringbone weave should greater strength be desired. The stitching 46 is made of a material with similar properties to nylon and is preferably polyester.

Figure 8:
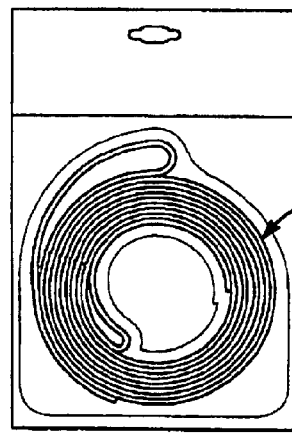
FIG. 8 is a plan view of the elongated member shown in a condensed coiled configuration and packaged for marketing display.

Referring to FIG. 8, since the transporting device 10 is made of a flat strap material, the device can be neatly coiled within a dense package and thus easily stored within the backpack or tackle box of the traveling sportsman 14a–c. Similarly, the transporting device can be neatly coiled for display purposes, mailing or delivery. Multiple coiled straps 12a–c of the device 10, whether or not having differing lengths, can be stacked upon one another in a co-axial arrangement to further benefit packaging.

While the forms of the invention herein disclosed constitute presently preferred embodiments many others are possible. It is not limited herein to mention all of the possible equivalent forms or ramifications of the invention. It is understood that the terms used herein are merely descriptive rather than limiting and that various changes may be made without departing from the spirit or scope of the invention.

What is claimed is:

1. A slain animal transporting device comprising:
  a first elongated flexible member having a user loop, a sub loop, a tensile length engaged to and extending between the user loop and the sub loop, and a slip knot wherein the tensile length extends through the sub loop;
  wherein the slip knot is wrapped about a body portion of a slain animal and the user loop is wrapped about a body portion of a user so that the slip knot tightens and remains taught about the slain animal body portion as a tensile force is exerted by the user upon the slain animal transporting device to drag the slain animal;
  a second elongated flexible member being separate and independent of the first elongated flexible member, wherein the second elongated flexible member has a slip knot; and
  wherein the slip knot of the first elongated flexible member is engaged to the slain animal and the slip knot of the second elongated flexible member is engaged to the user loop of the first elongated flexible member and the user loop of the second elongated flexible member is engaged to the user.

2. A slain animal transporting device comprising:
  a unitary first elongated flexible member having:
    a first user loop,
    a first sub loop,
    a first tensile length engaged to and extending between the first user loop and the first sub loop, a first slip knot wherein the first tensile length extends through the first sub loop, and wherein the first slip knot is wrapped about a body portion of a slain animal and the first user loop is wrapped about a body portion of a first user so that the first slip knot tightens and remains taught about the slain animal body portion as a tensile force is exerted by the first user upon the slain animal transporting device to drag the slain animal;

a unitary second elongated flexible member being separate and independent of the first elongated flexible member;

the second elongated flexible member having a second user loop, a second sub loop, a second tensile length engaged to and extending between the second user loop and the second sub loop, a second slip knot wherein the second tensile length extends through the second sub loop, and wherein the second slip knot is wrapped about the slain animal and the second user loop is wrapped about a body portion of a second user so that the second slip knot tightens and remains taught about the slain animal as a tensile force is exerted by the second user upon the second elongated flexible member to drag the slain animal; and wherein the first tensile length of the first elongated flexible member is substantially unequal in longitudinal length to the second tensile length of the second elongated flexible member.

3. The slain animal transporting device set forth in claim 2 wherein the size of the first user loop of the first elongated member is substantially unequal to the size of the second user loop of the second elongated member.

4. The slain animal transporting device set forth in claim 3 wherein the first and second elongated flexible members are made of straps which are coiled individually when stored.

5. The slain animal transporting device set forth in claim 4 wherein the coils of the first and second elongated flexible members are stacked co-axially when stored.

6. A slain animal transporting device comprising:

a first elongated flexible member having a first user loop, a first sub loop, a first tensile length engaged to and extending between the first user loop and the first sub loop, a first slip knot wherein the first tensile length extends through the first sub loop;

wherein the first slip knot is wrapped about a body portion of a slain animal and the first user loop is wrapped about a body portion of a first user so that the first slip knot tightens and remains taught about the slain animal body portion as a tensile force is exerted by the first user upon the slain animal transporting device to drag the slain animal;

a second elongated flexible member being separate and independent of the elongated flexible member;

wherein the first tensile length of the first elongated flexible member is substantially unequal in longitudinal length to a second tensile length of the second elongated flexible member;

wherein the size of the first user loop of the first elongated flexible member is substantially unequal to the size of a second user loop of the second elongated member; and wherein the first user loop of the first elongated flexible member wraps about the torso portion of the first user and is larger than the second user loop of the second elongated flexible member which wraps about a wrist of a second user.

7. The slain animal transporting device set forth in claim 6 wherein the first tensile length of the first elongated flexible member is longer than the second tensile length of the second elongated flexible member.

8. The slain animal transporting device set forth in claim 7 wherein the first elongated flexible member is of a different color than the second elongated flexible member signifying the different sizes.

9. A method of utilizing a slain animal transporting device comprising the steps of:

removing only a compact coiled strap from the person of a sportsman;

uncoiling the strap;

forming a slip knot by feeding a user loop end of the strap and a majority portion of a tensile length of the strap through an opposite sub loop end of the strap;

slipping the slip knot about a body portion of a slain animal;

wrapping the user loop about a torso of the sportsman;

dragging of the slain animal across terrain by the sportsman;

releasing the slip knot from the slain animal;

removing the tensile length from the sub-loop; and coiling only the strap for storage.

* * * * *